United States Patent
Ridge et al.

(10) Patent No.: US 7,336,837 B2
(45) Date of Patent: Feb. 26, 2008

(54) METHOD AND SYSTEM FOR CODING/DECODING OF A VIDEO BIT STREAM FOR FINE GRANULARITY SCALABILITY

(75) Inventors: Justin Ridge, Irving, TX (US); Yiliang Bao, Irving, TX (US); Marta Karczewicz, Irving, TX (US); Xianglin Wang, Irving, TX (US)

(73) Assignee: Nokia Corporation, Espoo (FI)

( * ) Notice: Subject to any disclaimer, the term of this patent is extended or adjusted under 35 U.S.C. 154(b) by 566 days.

(21) Appl. No.: 11/032,778

(22) Filed: Jan. 11, 2005

(65) Prior Publication Data
US 2006/0153462 A1    Jul. 13, 2006

(51) Int. Cl.
G06K 9/36 (2006.01)
H04N 7/14 (2006.01)

(52) U.S. Cl. .................................. 382/233; 348/14.13

(58) Field of Classification Search ................ 382/232, 382/233, 236; 348/14.13, 14.14, 14.15
See application file for complete search history.

(56) References Cited

U.S. PATENT DOCUMENTS 7,068,850 B2 * 6/2006 Youn .................... 382/251
2006/0257000 A1 * 11/2006 Boyce et al. .............. 382/100

FOREIGN PATENT DOCUMENTS

EP 0 537 932 4/1993
WO WO 2006/040656 4/2006

OTHER PUBLICATIONS

FGS block enhancements for scalable video coding, Y. Bao, M. Karczewicz, J. Ridge and X. Wang, International Organization for Standardization, ISO/IEC JTC1/SC29/WG11, MPEG/M11428, Spain, Oct. 2004, 11 pgs.
Scalable Video Model 3.0, Julien Reichel, Mathias Wien and Heiko Schwarz, International Organization for Standardization, ISO/IEC JTC1/SC29/WG11N6716, Spain, Oct. 2004, pp. 1-85.
Extension to AVC-based scalable video coding, Joint Video Team (JVT) of ISO/IEC MPEG & ITU-T VCEG (ISO/IEC JTC1/SC29/WG11 and ITU-T SG16 Q.6), Bao et al., Jul. 17-23, 2004, 5 pages.

* cited by examiner

Primary Examiner—Brian Le
(74) Attorney, Agent, or Firm—Foley and Lardner LLP

(57) ABSTRACT

Methods, computer code products and devices for encoding and/or decoding video data in multiple passes, the video data having a multiple components each component including multiple coefficients. The method can starting the next pass of the encoding or decoding process immediately after the end of the current encoding or decoding pass for a given component without regard to whether other components have finished the current encoding or decoding pass. In addition, stagger delays and dampers can be used to more closely regulate the encoding or decoding process to ensure that one component is not encoded or decoded too quickly with respect to other components.

38 Claims, 2 Drawing Sheets

METHOD AND SYSTEM FOR CODING/DECODING OF A VIDEO BIT STREAM FOR FINE GRANULARITY SCALABILITY

BACKGROUND OF THE INVENTION

A. Field of the Invention

The present invention is directed to the field of video coding and, more specifically, to scalable video coding.

B. Background

In some scenarios, it is desirable to transmit an encoded digital video sequence at some minimum or "base" quality, and in concert transmit an "enhancement" signal that may be combined with the minimum quality signal in order to yield a higher-quality decoded video sequence. Such an arrangement simultaneously allows some decoding of the video sequence by devices supporting some set of minimum capabilities (at the "base" quality), while enabling other devices with expanded capability to decode higher-quality versions of the same sequence, without incurring the increased cost associated with transmitting two independently coded versions of the same sequence.

In some situations, more than two levels of quality may be desired. In this case, multiple "enhancement" signals can be transmitted, each building on the "base" quality signal plus all lower-quality "enhancement" signals. Such "base" and "enhancement" signals are referred to as "layers" in the filed of scalable video coding, and the degree to which each enhancement layer improves on the reconstructed quality of the signal is referred to as the "granularity." Fine granularity scalability (FGS) is a type of scalability in which the incremental quality increases provided by each layer are relatively small.

Various FGS techniques are known and used. For example, in the context of MPEG-21 SVC, a block-based FGS scheme has been proposed. In this scheme, decoding of each FGS layer is divided into three passes: the "significance pass," the "refinement pass," and the "remainder pass." The significance pass identifies those coefficients that had previous reconstructed values of zero in the previous bit plane, and which had one or more neighboring coefficients with a non-zero reconstructed value in the previous bit plane. An encoded binary digit serves as a "significance bit" indicating whether the coefficient transitions from zero to non-zero in the current bit plane. The refinement pass identifies those coefficients that had reconstructed non-zero values in the previous bit plane. An encoded binary digit refines the precision of these coefficients in the current bit plane. The remainder pass encodes the remaining coefficients (i.e. those not already identified in the first or second passes). A "significance bit" is encoded for each coefficient, just as in the significance pass, however the transition from zero to non-zero is statistically less likely in the absence of neighboring non-zero values, thus justifying a separate pass for this category of non-zero coefficients.

If the video sequence involves decoding multiple components in a pass (such as both luminance and chrominance, written as YUV or YCbCr), the scheme proposed requires that, within each pass, all components must be completely decoded before moving on to the next pass. For example, the significance pass must be completed for both luminance and chrominance before the refinement pass can begin for either component.

In this proposed scheme, passes are arranged in subbands. For example, the significance pass can be described using the following pseudo-code:

```
For each subband
    For each block
        Decode one luminance coefficient
    For each block
        Decode one coefficient from each chrominance component
Go to refinement pass
```

Note that the algorithm fixes the relative start positions of the luminance and chrominance components, i.e. the first chrominance subband always occurs between the first and second luminance subbands. In addition, the "speed" at which a pass is completed is constant across the color components. For example, after the significance pass is 50% complete, both luminance and chrominance components will be 50% decoded.

A second scheme has been proposed which seeks to solve some of the problems associated with such a rigid structure. In this scheme, the number of coefficients coded from each block is not fixed. Pseudo-code for the significance pass for this scheme can be written as:

```
While values remain to be decoded
    For each block
        Decode one non-zero luminance coefficient and preceding zeros
        Decode one non-zero chrominance coefficient from each
        component and preceding zeros
Go to refinement pass
```

This scheme better interleaves luminance and chrominance values, since the "period" between non-zero values from a given component is a smaller unit (i.e. a block rather than a subband). However, again the entire significance pass must be completed for all components before moving to the remainder pass.

There are several problems with each of these approaches. For example, these schemes can suffer from coding inefficiency problems and do not provide much flexibility or control over the encoding/decoding process. As such, there is a need for an improved FGS coder that is more flexible than previous proposed schemes. There is also a need for a FGS coding scheme that provides an overall improvement in coding efficiency.

SUMMARY OF THE INVENTION

Embodiments of the present invention disclose methods, computer code products, and devices for encoding and/or decoding video data. In various embodiments of the invention the video data comprises multiple components, each component having multiple coefficients. The video data can be encoded or decoded in multiple passes.

According to embodiments of the invention, the encoding or decoding process can include determining whether there is a non-zero coefficient to encode or decode for a first component in a first pass and if there is a non-zero coefficient to encode or decode for the first component in the first pass, encoding or decoding the non-zero coefficient for the first component in the first pass. If there is not a non-zero coefficient to encode or decode for the first component in the first pass, the process can include determining whether there is a non-zero coefficient to encode or decode for the first component in a second pass and if there is a non-zero coefficient to encode or decode for the first component in the second pass, encoding or decoding the non-zero coefficient for the first component in the second pass. The process can continue by determining whether there is a non-zero coefficient to encode or decode for a second component in the first pass and if there is a non-zero coefficient to decode for the second component in the first pass, encoding or decoding the non-zero coefficient for the second component in the first pass. If there is not a non-zero coefficient to encode or decode for the second component in the first pass, determining whether there is a non-zero coefficient to encode or decode for the second component in the second pass and if there is a non-zero coefficient to encode or decode for the second component in the second pass, encoding or decoding the non-zero coefficient for the second component in the second pass.

Additional embodiments of the invention may include determining a stagger delay for at least one of the plurality of components and delaying encoding or decoding of the at least one of the plurality of components by the stagger delay. Stagger delays can determined for more than one component and the stagger delays can be different for different components. The stagger delay can be inferred from a ratio of bits previously encoded into or decoded from a bit stream, or its value can be encoded into or decoded from a bit stream.

In other embodiments, a damper value can be determined for at least one of the plurality of components and the damper value can be applied to encode or decode the at least one of the plurality of components on only select iterations of a pass. The damper value can be comprised of a mask of binary digits specifying in which select iterations the at least one of the plurality of components will be encoded or decoded. Similar to the stagger delay, the damper value can be inferred from a ratio of bits previously encoded into or decoded from a bit stream, or its value can be encoded into or decoded from a bit stream.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which.

DETAILED DESCRIPTION OF EXEMPLARY EMBODIMENTS

Embodiments of the invention present methods, computer code products, and devices for efficient FGS encoding and decoding. Embodiments of the present invention can be used to solve some of the problems inherent to existing solutions. For example, embodiments of the current invention can be used to improve the overall coding efficiency of an FGS scheme, to provide a more uniform/regular SNR characteristic, and to increase the flexibility of the system to provide added control, such as by controlling the luminance and chrominance bit distributions independently.

In this section, the term "enhancement layer" refers to a layer that is coded differentially compared to some lower quality reconstruction. The purpose of the enhancement layer is that, when added to the lower quality reconstruction, signal quality should improve, or be "enhanced". In this section, the term "base layer" applies to both a non-scalable base layer encoded using an existing video coding algorithm, and to a reconstructed enhancement layer relative to which a subsequent enhancement layer is coded.

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions. Any common programming language, such as C or C++, or assembly language, can be used to implement the invention.

Figure 1:
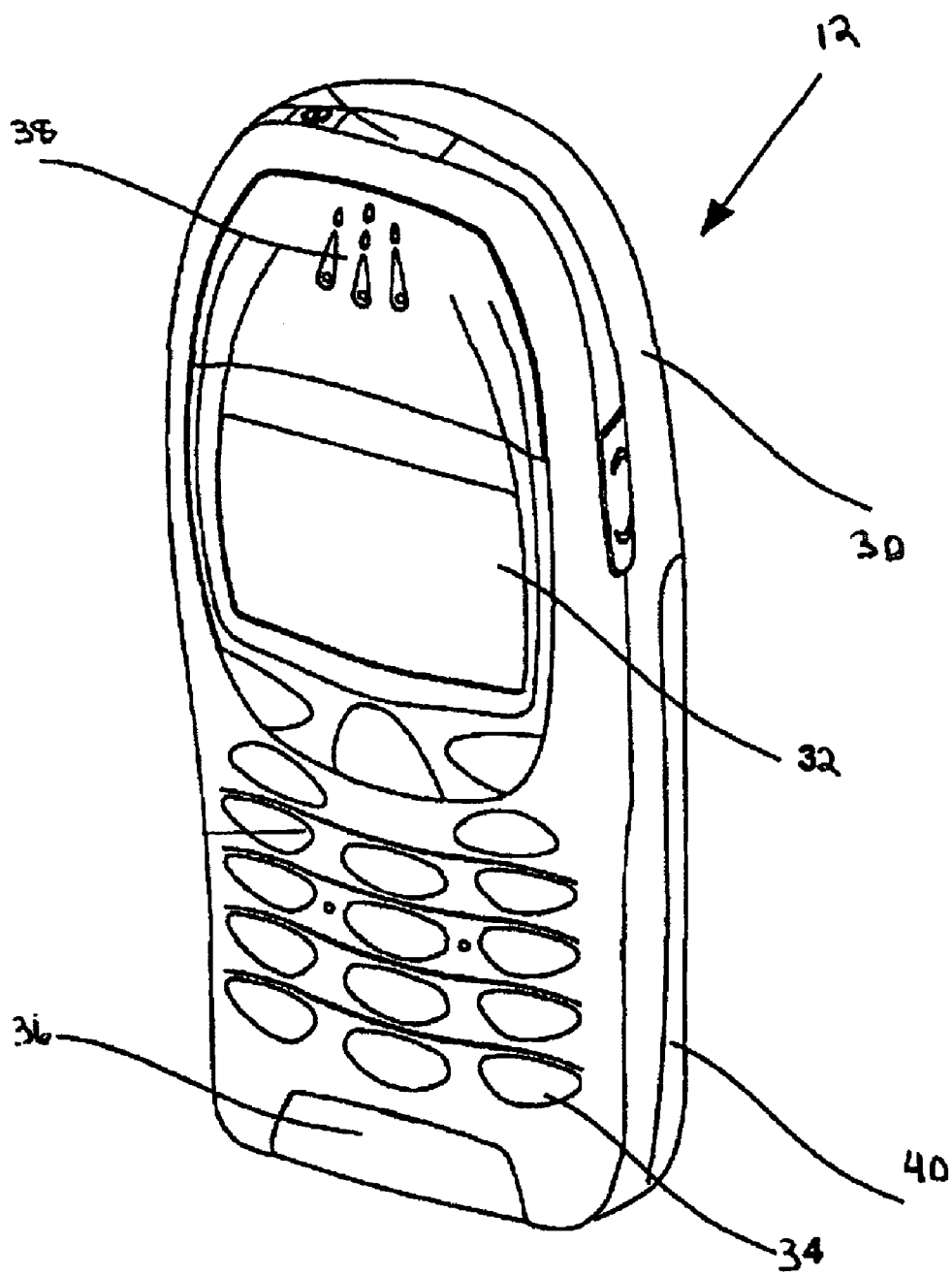
FIG. 1 is a perspective view of one embodiment of a communication device that can be used in the implementation of the present invention.
Figure 2:
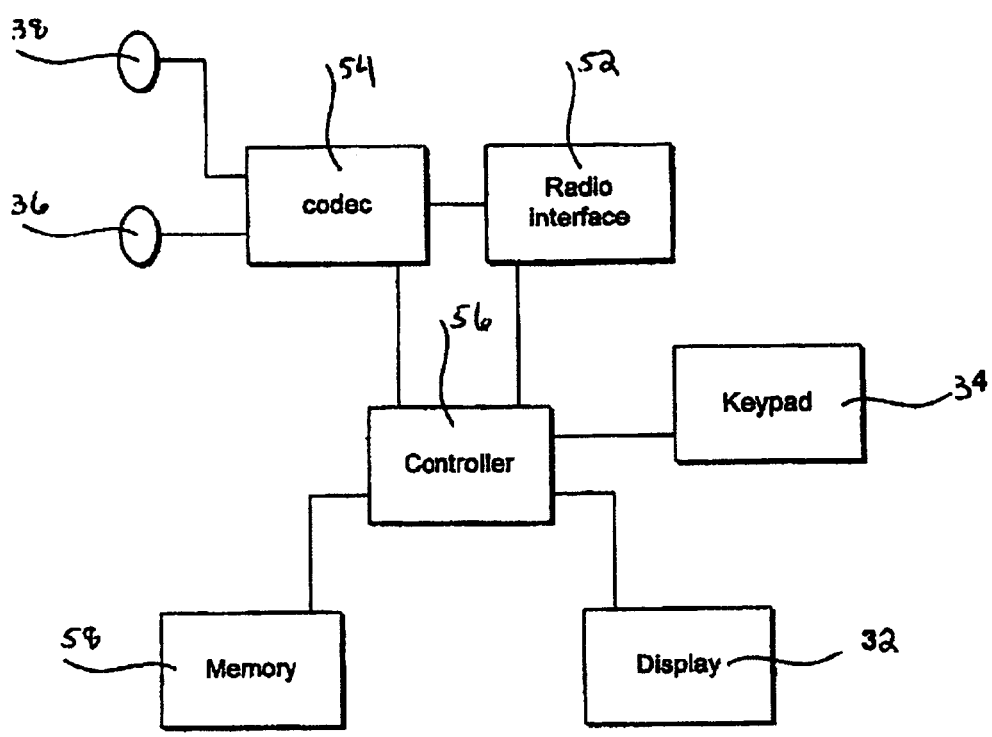
FIG. 2 is a block diagramming illustrating one embodiment of the communications device of FIG. 1.

FIGS. 1 and 2 show one possible implementation of the present invention is as part of a communication device (such as a mobile communication device like a cellular telephone, or a network device like a base station, router, repeater, etc.). However, it is important to note that the present invention is not limited to any type of electronic device and could be incorporated into devices such as personal digital assistants, personal computers, mobile telephones, and other devices. It should be understood that the present invention could be incorporated on a wide variety of devices 12.

The device 12 of FIGS. 1 and 2 includes a housing 30, a display 32, a keypad 34, a microphone 36, an ear-piece 38, a battery 40, radio interface circuitry 52, codec circuitry 54, a controller 56 and a memory 58. Individual circuits and elements are all of a type well known in the art, for example in the Nokia range of mobile telephones. The exact architecture of device 12 is not important. Different and additional components of device 12 may be incorporated into the device 12. The scalable video encoding and decoding techniques of the present invention could be performed in the controller 56 memory 58 of the device 12.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "module" as used herein and in the claims is intended to encompass implementations using one or more lines of software code, and/or hardware implementations, and/or equipment for receiving manual inputs.

In general, embodiment of the invention improves upon existing FGS schemes by removing the restriction that a given pass needs to be completed for all components before the next pass can begin. In other words, in a multiple-pass FGS scheme for multi-component video, the end of a current encoding or decoding pass for a given component can be immediately followed by the start of a next pass without regard to whether other components have finished the current encoding or decoding pass. Additionally, embodiment of the invention provide for the FGS encoding or decoding process to be "staggered" according to the component, and even within the component according to some criteria, so that, for example, the encoding or decoding of one component of the video stream may commence in advance of other components.

This leads to more regular quality improvement, i.e. the "plateaus" on a SNR curve associated with movement from one pass to the next are less pronounced. By removing the restriction that all color components start at the same time, the balance of bits between luminance and chrominance components can be more precisely controlled. In addition, an overall improvement in coding efficiency can be realized using embodiments of the invention.

In order to describe embodiments of the invention, first we consider the issue of "independent pass boundaries". As described above, the pseudo-code for the significance pass in one of the proposed FGS decoding schemes can be described as:

```
While values remain to be decoded
    For each block
        Decode one non-zero luminance
            coefficient and preceding zeros
        Decode one non-zero chrominance
            coefficient from each
            component and preceding zeros
    Go to refinement pass
```

According to this scheme, the number of coefficients to be coded in each iteration of the outer loop may vary. For example, consider the case where there is a single block of coefficients, the luminance coefficients having values 3,1,0, 1,0,0,1,0 and a single chrominance component having coefficient values 1,0,0,0,1,0,0,0. In each iteration, the following values would be decoded:

| Iteration | Luminance | Chrominance |
|---|---|---|
| 1 | 3 | 1 |
| 2 | 1 | 0, 0, 0, 1 |
| 3 | 0, 1 | End-of-block |
| 4 | 0, 0, 1 | N/A |
| 5 | End-of-block | N/A |

It can be seen that the significance pass for chrominance is entirely completed after three iterations whereas five iterations are required for luminance. Therefore, for the fourth and fifth iterations, nothing is decoded for chrominance, so that the quality (or SNR) remains constant even though rate is increasing. This results in a "plateau" on the SNR curve.

According to embodiments of the present invention the refinement pass for chrominance can be allowed to begin while the fourth and fifth significance iterations for luminance are being completed. In this manner, a more uniform SNR characteristic can be achieved. Thus, pseudo-code describing this aspect of one embodiment of the invention can be written as follows:

```
While values remain to be decoded
    For each block
        If significance pass NOT complete for luminance
            Decode one non-zero luminance coefficient
            and preceding
            zeros
        Else
            Decode refinement information for next
            luminance coefficient
        If significance pass NOT complete for chrominance
            Decode one non-zero chrominance coefficient
            from each
            component and preceding zeros
        Else
            Decode refinement information for next
            chrominance
            coefficients
NO SEPARATE REFINEMENT PASS
```

Continuing with the example, the table would become:

| Iteration | Luminance | Chrominance |
|---|---|---|
| 1 | 3 | 1 |
| 2 | 1 | 0, 0, 0, 1 |
| 3 | 0, 1 | End-of-block |
| 4 | 0, 0, 1 | Refinement data |
| 5 | End-of-block | Refinement data |

Thus the "pass" currently being executed becomes a function of each color component rather than common between them. Embodiments of this aspect of the invention can be extended to apply when there are more than two types of passes or when there are more than two components.

In some cases a large plateau on the SNR curve at higher rates can be the result of one color component being decoded too quickly. In another embodiment of the invention, these situations can be overcome by using a "stagger" mechanism and a "damper" mechanism in the FGS scheme. Using the above example, it may be possible to obtain better performance if no chrominance values are encoded on the first iteration, i.e. the table would be revised as follows:

| Iteration | Luminance | Chrominance |
|---|---|---|
| 1 | 3 | N/A |
| 2 | 1 | 1 |
| 3 | 0, 1 | 0, 0, 0, 1 |
| 4 | 0, 0, 1 | End-of-block |
| 5 | End-of-block | Refinement data |

This delay in encoding chrominance values may be one embodiment of a stagger mechanism according to the present invention. In this embodiment of the invention, the start of the FGS layer staggered so that the chrominance starts one iteration (or "cycle") behind luminance. The optimal number of cycles by which to stagger the start of a component (generally chrominance) depends on the individual video sequence, and may be zero. In a further extension of the stagger concept of one embodiment of the invention, certain categories of coefficients within a color component may be staggered differently. For example, chrominance AC coefficients may be staggered by more cycles than chrominance DC coefficients.

In one embodiment, only chrominance AC data is staggered, but not luminance or chrominance DC. After decoding the luminance and chrominance DC, the amount of stagger can be computed either by an algorithm or a lookup table. In one embodiment, the lookup table measures the ratio of bits spent on the luminance and chrominance DC and determines the chrominance AC stagger as follows:

| Ratio luminance:<br>chrominance DC bits | Cycles to stagger |
|---|---|
| 0-14 | 3 |
| 15-29 | 2 |
| 30+ | 1 |

When decoding, the stagger value can either be inferred from the ratio of bits decoded or can be decoded explicitly from the bit stream. In another embodiment, the rate at which individual color components are encoded can be "damped" using the described damper mechanism to avoid reaching quality "saturation" too early. Continuing the above example, it may be decided that it is beneficial to encode chrominance values only on every other iteration, so that the table becomes:

| Iteration | Luminance | Chrominance |
|---|---|---|
| 1 | 3 | N/A |
| 2 | 1 | 1 |
| 3 | 0, 1 | N/A |
| 4 | 0, 0, 1 | 0, 0, 0, 1 |
| 5 | End-of-block | N/A |

The "damper" value could be inferred based on bit ratios such as can be done with the "stagger" value. In another embodiment, the damper value can be decoded from the bit stream. The decoded symbol can be indicative of a 'mask' of binary digits specifying which iterations the component is to be decoded for, e.g. the chrominance mask in the above table could be 01010.

While embodiments of the invention have been described in the context of decoding video data, concepts of the invention can also be applied to encoding video data. For example, in the processes and systems described above, the next pass of an encoding process can start immediately after the end of the current encoding pass for a given component without regard to whether other components have finished the current decoding pass. Thus, it can readily be appreciated from the detailed description of the decoding processes and systems, that embodiments of the invention can include encoders and encoding processes.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principals of the present invention and its practical application to enable one skilled in the art to utilize the present invention in various embodiments and with various modifications as are suited to the particular use contemplated.

What is claimed is:

1. A method of decoding video data in a plurality of passes, the video data having a plurality of components each component including a plurality of coefficients, the method comprising:
    determining whether there is a non-zero coefficient to decode for a first component in a first pass;
    if there is a non-zero coefficient to decode for the first component in the first pass, decoding the non-zero coefficient for the first component in the first pass;
    if there is not a non-zero coefficient to decode for the first component in the first pass, determining whether there is a non-zero coefficient to decode for the first component in a second pass;
    if there is a non-zero coefficient to decode for the first component in the second pass, decoding the non-zero coefficient for the first component in the second pass
    determining whether there is a non-zero coefficient to decode for a second component in the first pass;
    if there is a non-zero coefficient to decode for the second component in the first pass, decoding the non-zero coefficient for the second component in the first pass;
    if there is not a non-zero coefficient to decode for the second component in the first pass, determining whether there is a non-zero coefficient to decode for the second component in the second pass;
    if there is a non-zero coefficient to decode for the second component in the second pass, decoding the non-zero coefficient for the second component in the second pass.

2. The method of claim 1 further comprising determining a stagger delay for at least one of the plurality of components and delaying decoding of the at least one of the plurality of components by the stagger delay.

3. The method of claim 2 wherein a stagger delay is determined for at least two of the plurality of components.

4. The method of claim 3 wherein a different stagger delay is determined for at least two of the plurality of components.

5. The method of claim 2 wherein the stagger delay is inferred from a ratio of bits decoded.

6. The method according to claim 2 wherein the stagger delay is decoded from a bit stream.

7. The method according to claim 1, further comprising determining a damper value for at least one of the plurality of components and applying the damper value to decode the at least one of the plurality of components on only select iterations of a pass.

8. The method according to claim 7 wherein the damper value comprises a mask of binary digits specifying in which select iterations the at least one of the plurality of components will be decoded.

9. The method according to claim 7, wherein the damper value is inferred from a ratio of bits decoded.

10. The method according to claim 7, wherein the damper value is decoded from a bit stream.

11. The method according to claim 1, wherein the first component is luminance and the second component is chrominance.

12. A computer readable medium storing a computer code product for decoding video data in a plurality of passes, the video data having a plurality of components each component including a plurality of coefficients, the computer code product comprising:
computer code configured to:
determine whether there is a non-zero coefficient to decode for a first component in a first pass;
if there is a non-zero coefficient to decode for the first component in the first pass, decode the non-zero coefficient for the first component in the first pass;
if there is not a non-zero coefficient to decode for the first component in the first pass, determine whether there is a non-zero coefficient to decode for the first component in a second pass;
if there is a non-zero coefficient to decode for the first component in the second pass, decode the non-zero coefficient for the first component in the second pass
determine whether there is a non-zero coefficient to decode for a second component in the first pass;
if there is a non-zero coefficient to decode for the second component in the first pass, decode the non-zero coefficient for the second component in the first pass;
if there is not a non-zero coefficient to decode for the second component in the first pass, determine whether there is a non-zero coefficient to decode for the second component in the second pass;
if there is a non-zero coefficient to decode for the second component in the second pass, decode the non-zero coefficient for the second component in the second pass.

13. The computer code product of claim 12 further comprising computer code configured to determine a stagger delay for at least one of the plurality of components and delay decoding of the at least one of the plurality of components by the stagger delay.

14. The computer code product according to claim 12, further comprising computer code configured to determine a damper value for at least one of the plurality of components and apply the damper value to decode the at least one of the plurality of components on only select iterations of a pass.

15. The computer code product according to claim 14 wherein the damper value comprises a mask of binary digits specifying in which select iterations the at least one of the plurality of components will be decoded.

16. A device for decoding video data in a plurality of passes, the video data having a plurality of components each component including a plurality of coefficients, the device comprising:
a processor configured to execute instructions;
memory configured for storing a computer program; and
a computer program comprising instructions configured for causing the processor to:
determine whether there is a non-zero coefficient to decode for a first component in a first pass;
if there is a non-zero coefficient to decode for the first component in the first pass, decode the non-zero coefficient for the first component in the first pass;
if there is not a non-zero coefficient to decode for the first component in the first pass, determine whether there is a non-zero coefficient to decode for the first component in a second pass;
if there is a non-zero coefficient to decode for the first component in the second pass, decode the non-zero coefficient for the first component in the second pass
determine whether there is a non-zero coefficient to decode for a second component in the first pass;
if there is a non-zero coefficient to decode for the second component in the first pass, decode the non-zero coefficient for the second component in the first pass;
if there is not a non-zero coefficient to decode for the second component in the first pass, determine whether there is a non-zero coefficient to decode for the second component in the second pass;
if there is a non-zero coefficient to decode for the second component in the second pass, decode the non-zero coefficient for the second component in the second pass.

17. The device of claim 16 wherein the computer program further comprises instructions configured for causing the processor to determine a stagger delay for at least one of the plurality of components and delay decoding of the at least one of the plurality of components by the stagger delay.

18. The device according to claim 16, wherein the computer program further comprises instructions configured for causing the processor to determine a damper value for at least one of the plurality of components and apply the damper value to decode the at least one of the plurality of components on only select iterations of a pass.

19. The device according to claim 18 wherein the damper value comprises a mask of binary digits specifying in which select iterations the at least one of the plurality of components will be decoded.

20. A method of encoding video data in a plurality of passes, the video data having a plurality of components each component including a plurality of coefficients, the method comprising:
determining whether there is a non-zero coefficient to encode for a first component in a first pass;
if there is a non-zero coefficient to encode for the first component in the first pass, encoding the non-zero coefficient for the first component in the first pass;
if there is not a non-zero coefficient to encode for the first component in the first pass, determining whether there is a non-zero coefficient to encode for the first component in a second pass;
if there is a non-zero coefficient to encode for the first component in the second pass, encoding the non-zero coefficient for the first component in the second pass
determining whether there is a non-zero coefficient to encode for a second component in the first pass;
if there is a non-zero coefficient to encode for the second component in the first pass, encoding the non-zero coefficient for the second component in the first pass;
if there is not a non-zero coefficient to encode for the second component in the first pass, determining whether there is a non-zero coefficient to encode for the second component in the second pass;

if there is a non-zero coefficient to encode for the second component in the second pass, encoding the non-zero coefficient for the second component in the second pass.

21. The method of claim 20 further comprising determining a stagger delay for at least one of the plurality of components and delaying encoding of the at least one of the plurality of components by the stagger delay.

22. The method of claim 21 wherein a stagger delay is determined for at least two of the plurality of components.

23. The method of claim 22 wherein a different stagger delay is determined for at least two of the plurality of components.

24. The method of claim 21 wherein the stagger delay is inferred from a ratio of bits decoded.

25. The method according to claim 21 wherein the stagger delay is encoded into a bit stream.

26. The method according to claim 20, further comprising determining a damper value for at least one of the plurality of components and applying the damper value to encode the at least one of the plurality of components on only select iterations of a pass.

27. The method according to claim 26 wherein the damper value comprises a mask of binary digits specifying in which select iterations the at least one of the plurality of components will be encoded.

28. The method according to claim 26, wherein the damper value is inferred from a ratio of bits decoded.

29. The method according to claim 26, wherein the damper value is encoded into a bit stream.

30. The method according to claim 20, wherein the first component is luminance and the second component is chrominance.

31. A computer readable medium storing a computer code product for encoding video data in a plurality of passes, the video data having a plurality of components each component including a plurality of coefficients, the computer code product comprising:

computer code configured to:

determine whether there is a non-zero coefficient to encode for a first component in a first pass;

if there is a non-zero coefficient to encode for the first component in the first pass, encode the non-zero coefficient for the first component in the first pass;

if there is not a non-zero coefficient to encode for the first component in the first pass, determine whether there is a non-zero coefficient to encode for the first component in a second pass;

if there is a non-zero coefficient to encode for the first component in the second pass, encode the non-zero coefficient for the first component in the second pass determine whether there is a non-zero coefficient to encode for a second component in the first pass;

if there is a non-zero coefficient to encode for the second component in the first pass, encode the non-zero coefficient for the second component in the first pass;

if there is not a non-zero coefficient to encode for the second component in the first pass, determine whether there is a non-zero coefficient to encode for the second component in the second pass;

if there is a non-zero coefficient to encode for the second component in the second pass, encode the non-zero coefficient for the second component in the second pass.

32. The computer code product of claim 31 further comprising computer code configured to determine a stagger delay for at least one of the plurality of components and delay encoding of the at least one of the plurality of components by the stagger delay.

33. The computer code product according to claim 31, further comprising computer code configured to determine a damper value for at least one of the plurality of components and apply the damper value to encode the at least one of the plurality of components on only select iterations of a pass.

34. The computer code product according to claim 33 wherein the damper value comprises a mask of binary digits specifying in which select iterations the at least one of the plurality of components will be encoded.

35. A device for encoding video data in a plurality of passes, the video data having a plurality of components each component including a plurality of coefficients, the device comprising:

a processor configured to execute instructions;

memory configured for storing a computer program; and a computer program comprising instructions configured for causing the processor to:

determine whether there is a non-zero coefficient to encode for a first component in a first pass;

if there is a non-zero coefficient to encode for the first component in the first pass, encode the non-zero coefficient for the first component in the first pass;

if there is not a non-zero coefficient to encode for the first component in the first pass, determine whether there is a non-zero coefficient to encode for the first component in a second pass;

if there is a non-zero coefficient to encode for the first component in the second pass, encode the non-zero coefficient for the first component in the second pass determine whether there is a non-zero coefficient to encode for a second component in the first pass;

if there is a non-zero coefficient to encode for the second component in the first pass, encode the non-zero coefficient for the second component in the first pass;

if there is not a non-zero coefficient to encode for the second component in the first pass, determine whether there is a non-zero coefficient to encode for the second component in the second pass;

if there is a non-zero coefficient to encode for the second component in the second pass, encode the non-zero coefficient for the second component in the second pass.

36. The device of claim 35 wherein the computer program further comprises instructions configured for causing the processor to determine a stagger delay for at least one of the plurality of components and delay encoding of the at least one of the plurality of components by the stagger delay.

37. The device according to claim 35, wherein the computer program further comprises instructions configured for causing the processor to determine a damper value for at least one of the plurality of components and apply the damper value to encode the at least one of the plurality of components on only select iterations of a pass.

38. The device according to claim 37 wherein the damper value comprises a mask of binary digits specifying in which select iterations the at least one of the plurality of components will be encoded.

* * * * *